(12) United States Patent
Do

(10) Patent No.: US 6,193,888 B1
(45) Date of Patent: Feb. 27, 2001

(54) PRIMARY AND SECONDARY CLARIFIER'S EFFLUENT LAUNDER DAM

(75) Inventor: Paul Do, Calgary (CA)

(73) Assignee: The City of Calgary, Alberta (CA)

( * ) Notice: Subject to any disclaimer, the term of this patent is extended or adjusted under 35 U.S.C. 154(b) by 0 days.

(21) Appl. No.: 09/175,415

(22) Filed: Oct. 20, 1998

(30) Foreign Application Priority Data

May 27, 1998 (CA) .................................................. 2238792

(51) Int. Cl.[7] .................................................. B01D 21/02
(52) U.S. Cl. .................................................. 210/532.1
(58) Field of Search .................................. 210/153, 154, 210/532.1; 209/44

(56) References Cited

U.S. PATENT DOCUMENTS

| | | | |
|---|---|---|---|
| 247,077 | * | 9/1881 | Lodwick . |
| 3,214,021 | * | 10/1965 | Applebaum ........................... 210/108 |
| 4,070,277 | | 1/1978 | Uban et al. . |
| 4,134,833 | * | 1/1979 | McCormick .......................... 210/121 |
| 4,290,527 | * | 9/1981 | Wright ................................... 209/44 |
| 4,462,909 | | 7/1984 | Kennel . |
| 4,592,833 | * | 6/1986 | Perdue ................................... 209/44 |
| 4,693,821 | | 9/1987 | Goronszy et al. . |
| 5,047,151 | | 9/1991 | Brandkvist . |
| 5,057,219 | | 10/1991 | Fujiwara . |
| 5,108,609 | | 4/1992 | Burt . |
| 5,520,825 | | 5/1996 | Rice . |
| 5,695,648 | | 12/1997 | Fassbender et al. . |

FOREIGN PATENT DOCUMENTS 1 237 831   6/1988  (CA) .

OTHER PUBLICATIONS

Definition of "Sluice"—p. 1265—Websters New World Dictionary—3rd College Edition, 1988.*

* cited by examiner

Primary Examiner—Robert J. Popovics
(74) Attorney, Agent, or Firm—Sughrue, Mion, Zinn, Macpeak & Seas, PLLC

(57) ABSTRACT

A method and apparatus is provided for converting a conventional waste water treatment plant for use with BPR and/or BPNR processes downstream of a clarifier. The effluent launder is flooded by means of a dam installed in the effluent launder, and waste water is guided to the outlet of the effluent launder by means of a sluice, thereby minimizing air entrainment and turbulence of the waste water downstream of the dam. Benefits obtained by means of the present invention include reduced noise, reduced emission of noxious and malodorous gasses, reduced losses of VFAs from the waste water, and reduced uptake of oxygen into the waste water. In addition, growth of algae within the clarifier is greatly reduced.

13 Claims, 4 Drawing Sheets

B-B

PRIMARY AND SECONDARY CLARIFIER'S EFFLUENT LAUNDER DAM

CROSS-REFERENCE TO RELATED APPLICATIONS

This is application is based on, and claims priority of Canadian Patent Application No. 2,238,792, filed on May 27, 1998.

MICROFICHE APPENDIX

Not Applicable

SUMMARY OF THE INVENTION

The term "clarifier" as used herein shall be understood to refer to both primary and secondary clarifiers used in waste water treatment plants (WWTPs).

This invention relates sewage treatment processes, and in particular to a method and apparatus for converting a conventional sewage clarifier for use where anaerobic treatment processes downstream of the clarifier is contemplated.

Conventional waste water treatment plants (WWTPs) typically employ multi-stage treatment of sewage. Typically, raw sewage is fed into one or more clarifiers in which heavy solids settle out of suspension by gravity. Because of the volume of raw sewage which must be handled in modem installations, and the necessity of reducing turbulence in the flow, the clarifiers tend to be very large structures, ranging between 10 and 300 feet in diameter, and are typically open to the atmosphere. Conventionally, the clarifier is circular (although rectangular clarifiers are known) and raw sewage is supplied to the clarifier through a centrally located pipe. As the sewage flows away from the inlet pipe, it slows down and becomes sufficiently quiescent that heavy solids will settle out of suspension. Frequently, lighter materials will also accumulate on the surface as a scum layer, which can be removed by suitable dams or the like. Water (minus the heavy solids) flows over a V-notch weir and cascades into a trough (called an "Effluent launder") which surrounds the clarifier. This clarifier effluent may be directed into a secondary clarifier for further solid separation, or into other equipment for secondary and tertiary water treatment, which typically utilize microbiological processes.

Traditionally, secondary and tertiary water treatment processes have been aerobic, so that it has been desirable to introduce as much oxygen ($O_2$) into the clarifier effluent stream as possible. Accordingly, the V-notch weir and effluent launder of conventional clarifiers are typically constructed so that the water experiences a significant drop (generally 2–4 feet in height) into the effluent launder so as to maximize oxygen uptake by the water prior to secondary treatment of the waste water stream.

While effective at introducing oxygen into the effluent, this arrangement has several disadvantages. In particular, numerous odorous and noxious gases, such as hydrogen sulfide, ammonia, mercaptans, thioethers, indoles, skatoles, chlorine, carbon dioxide, carbon monoxide, and sulfur dioxide, are continuously released into to the atmosphere. These gases create major safety and health concerns, as well as environmental pollution. Additionally, the continuous cascade of water into the effluent launder generates a substantial amount of noise. Consequently, a WWTP tends to be a noisy, hazardous, and odorous facility, especially in the vicinity of the clarifiers, resulting in numerous citizens' complaints, and often necessitate the installation and operation of costly odor containment and removal systems.

Furthermore, the conventional V-notch weir/effluent launder arrangement is unsuitable where modem biological phosphorus removal (BPR), or biological phosphorus and nitrogen removal (BPNR) processes are to be used for subsequent processing of the waste water, downstream of the clarifiers. In BPR or BPNR processes, wastewater flows from the clarifiers to open-air reactors where biological removal of nitrogen and phosphorus takes place. Each reactor has three different process zones: anaerobic, anoxic, and aerobic. The first portion of each reactor is the anaerobic zone, which must have no dissolved oxygen ($DO_2$) and have as high concentrations of volatile fatty acids (VFAs), such as acetic acid, propionic acid, butyric acid, as possible. The anaerobic zone acts as a "biological selector" that allows the exclusive growth and reproduction of naturally-occurring phosphorus removal bacteria (such as Acinetobacter and Pseudomonas ), which are also called BioP bacteria. These bacteria thrive under anaerobic conditions, and VFAs are the only types of food that BioP bacteria can utilize for their growth and reproduction. The higher the concentrations of VFAs are in the anaerobic zone, the more growth and reproduction BioP bacteria will have, and the more stable and efficient the BPR and BPNR treatment processes will be.

In the anaerobic zone, DO2 must be kept as close as possible to 0 mg/L. Any $DO_2$, present will allow other wastewater microorganisms to consume the VFAs that must be reserved solely as substrate for the exclusive growth and reproduction of BioP bacteria. However, the conventional V-Notch weir/effluent launder arrangement of clarifiers is designed to maximize $DO_2$ in the waste water downstream of the clarifiers. Furthermore, significant amounts of VFAs are released into the atmosphere along with the malodorous gasses described above, thereby reducing the materials which are essential to the growth and reproduction of BioP bacteria.

Because of this deficiency of conventional clarifiers, and the high capital cost of their replacement with updated clarifier designs, the utilization of BPR or BPNR processes has been severely limited, in-spite of their improved efficiency.

An object of the present invention is to provide a method an apparatus for overcoming the above-noted deficiencies in the prior art by achieving significant reductions in the production of noise, and the release of noxious gasses and VFA's as compared to conventional clarifiers.

Another object of the invention is to provide a retrofitable apparatus which can be used to convert a conventional clarifier for use with BPR and/or BPNR processes.

Accordingly, an aspect of the present invention provides a method of converting a conventional waste water treatment plant for use with BPR and/or BPNR processes downstream of a clarifier, the method comprising flooding the effluent launder of the clarifier, and minimizing the turbidity of water flowing into the outlet of the effluent launder.

A further aspect of the present invention provides a dam assembly designed to be installed into the effluent launder of an existing clarifier to flood the effluent launder. The dam assembly generally comprises a dam wall and a sluice ramp secured in the effluent launder by supporting members. The dam wall includes a narrow opening at its base, and the sluice ramp includes a complementary opening, so that some water in the flooded effluent launder passes under the dam assembly, thereby preventing suspended solids from settling near the dam assembly. The majority of the waste-water stream flows over the top of the dam wall and down the sluice ramp. The sluice ramp is angled so that turbidity of the waste-water down-stream of the dam assembly is minimized, thereby minimizing oxygen uptake by the waste-water. A control dam prevents waste-water from passing over the V-notch weir in the immediate vicinity (and downstream) of the dam assembly.

A pair of dam assemblies are used, one on each side of the effluent launder outlet. This ensures that most of the effluent launder is flooded, and the required length of the control dam is minimized.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
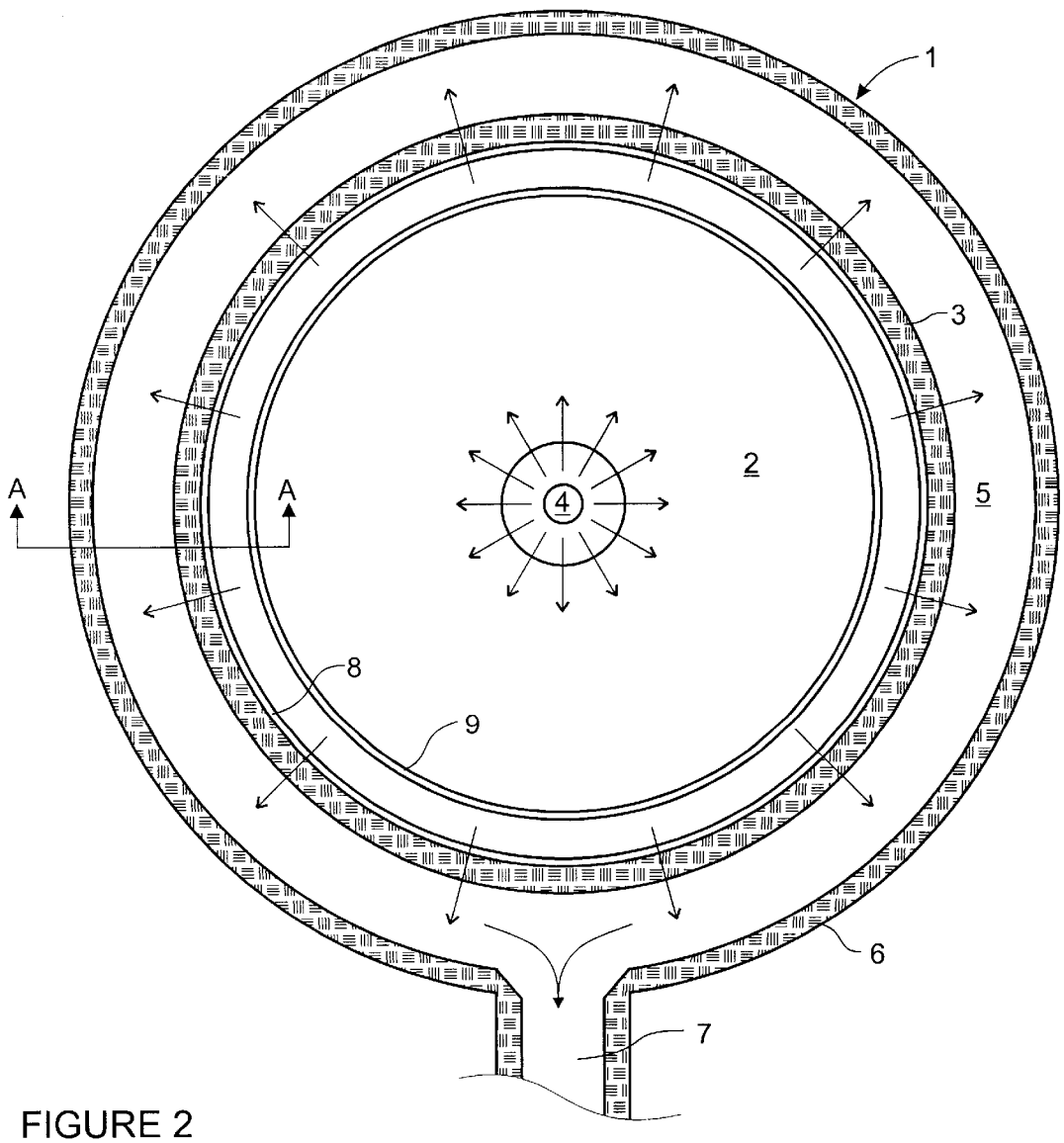
FIG. 1 is a plan view showing a conventional clarifier.
Figure 2:
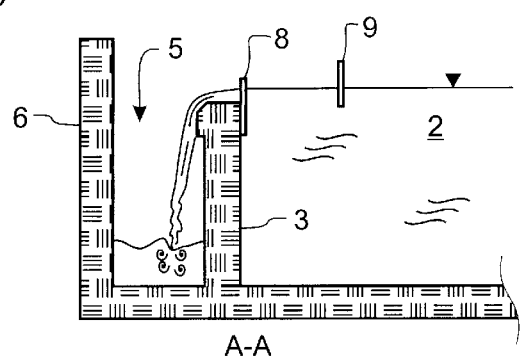
FIG. 2 is a partial cross-section of the clarifier of FIG. 1 taken along line A—A, showing a conventional cascade of waste water into the effluent launder of the clarifier.

For ease of understanding the present invention, the features of a conventional clarifier will first be described with reference to FIGS. 1 and 2. As shown in FIG. 1, a conventional clarifier 1 comprises a generally circular structure of a settling tank 2 defined by a circular ring-wall 3. An inlet pipe 4 mounted in the center of the settling tank 2 is used to introduce raw sewage into the clarifier 1. A trough or effluent launder 5 defined by the ring wall 3 and an outer, perimeter wall 6, surrounds settling tank 2, and includes an outlet 7 through which treated waste water flows for further processing. A V-notch weir 8 is affixed to the upper portion of the ring wall 3, and a surface dam 9 is often mounted inside the settling tank 2 to prevent floating materials from reaching the V-notch weir 8.

In use, raw sewage (which may have been previously filtered to remove grit and the like) is introduced into settling tank 2 through the inlet pipe 4 and flows outward in as indicated by the arrows. As the waste water flows outwards, it slows down sufficiently and becomes sufficiently quiescent that suspended solids are separated from the water by gravity. When the waste water reaches the ring wall 3, it flows over the top of the wall 3, past the V-notch weir 8, and cascades into the effluent launder 5. In this case, the V-notch weir 8 serves to regulate flow and introduces turbulence into the waste water. In order to further increase turbulence, the top portion of the ring wall 3 can be shaped to ensure that the waste water fully separates from the ring wall 3 and falls freely (through a drop of typically 2 4 feet) into the effluent launder 5. When the freely falling waste water enters the stream of water flowing in the effluent launder, a high amount of air entrainment and turbulence is generated, thereby maximizing the introduction of O2 into the waste water. At the same time significant amounts of malodorous noxious gasses (such as, for example, hydrogen sulfide, ammonia, mercaptans, thioethers, indoles, skatoles, chlorine, carbon dioxide, carbon monoxide, and sulfur dioxide) and VFA's are released into the atmosphere.

Figure 3:
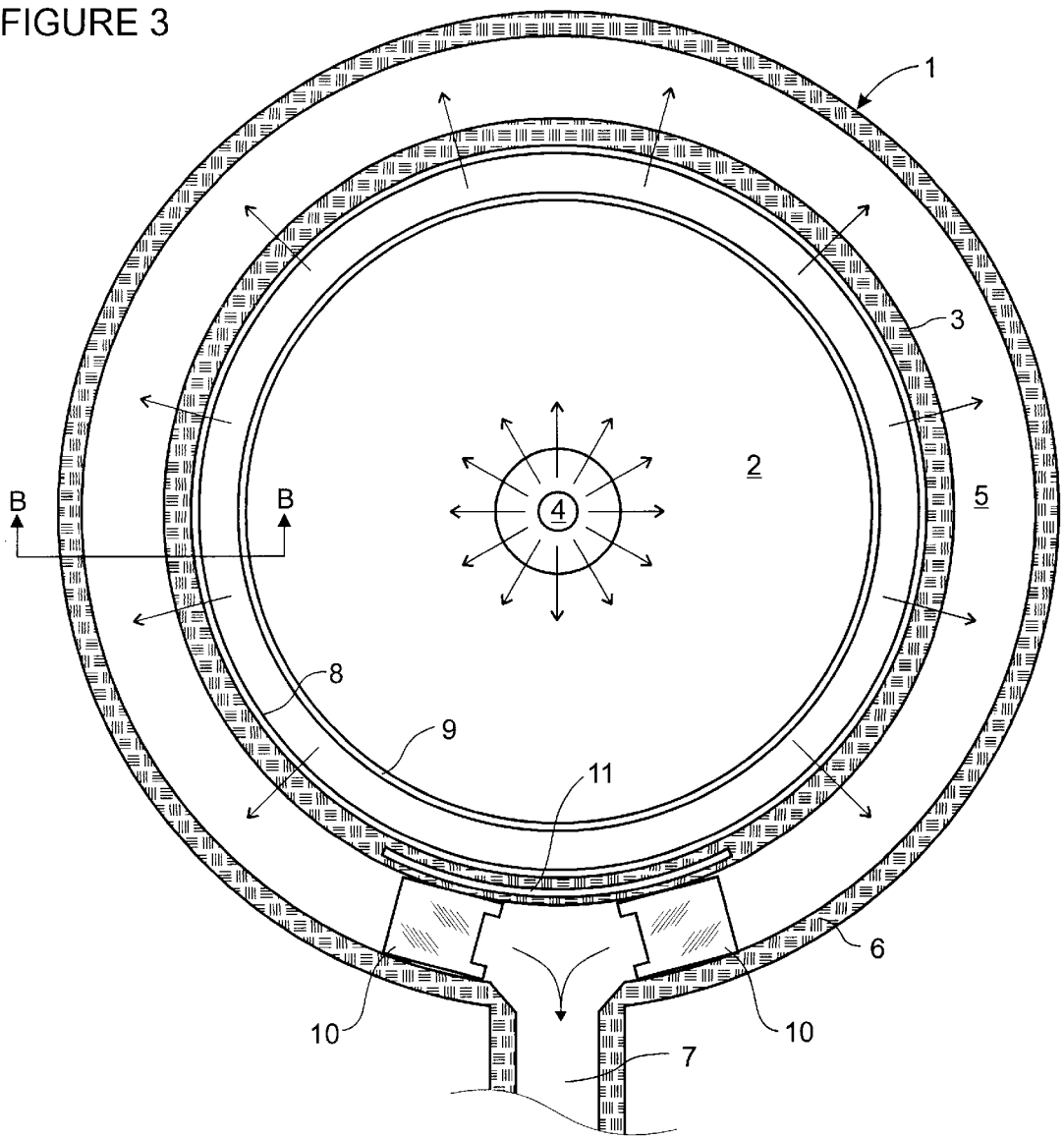
FIG. 3 is a plan view showing a conventional clarifier which has been modified in accordance with an embodiment of the present invention.
Figure 4:
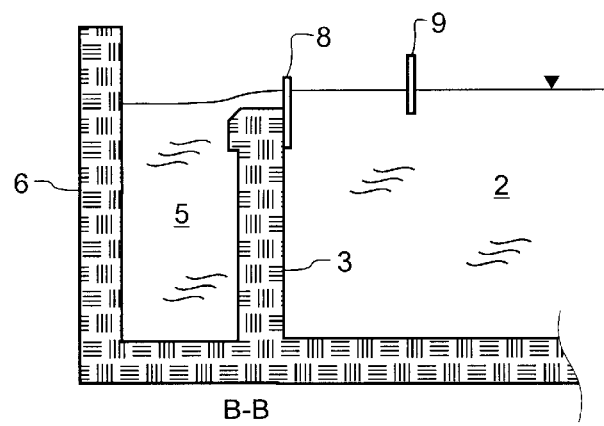
FIG. 4 is a partial cross-section of the clarifier of FIG. 3 taken along line B—B, showing a smooth flow of waste water into the flooded effluent launder of the clarifier.

Referring now to FIGS. 3 and 4, the present invention operates by flooding most of the effluent launder, and by guiding the waste water to the outlet 7 of the effluent launder 5 in such a manner as to reduce air entrainment and turbulence. In the illustrated embodiment, this is accomplished by way of a pair of dam assemblies 10 mounted in the effluent launder 5 proximal the outlet 7, and a control dam 11 mounted on the ring wall 3 in the vicinity of the dam assemblies 10.

Figure 5:
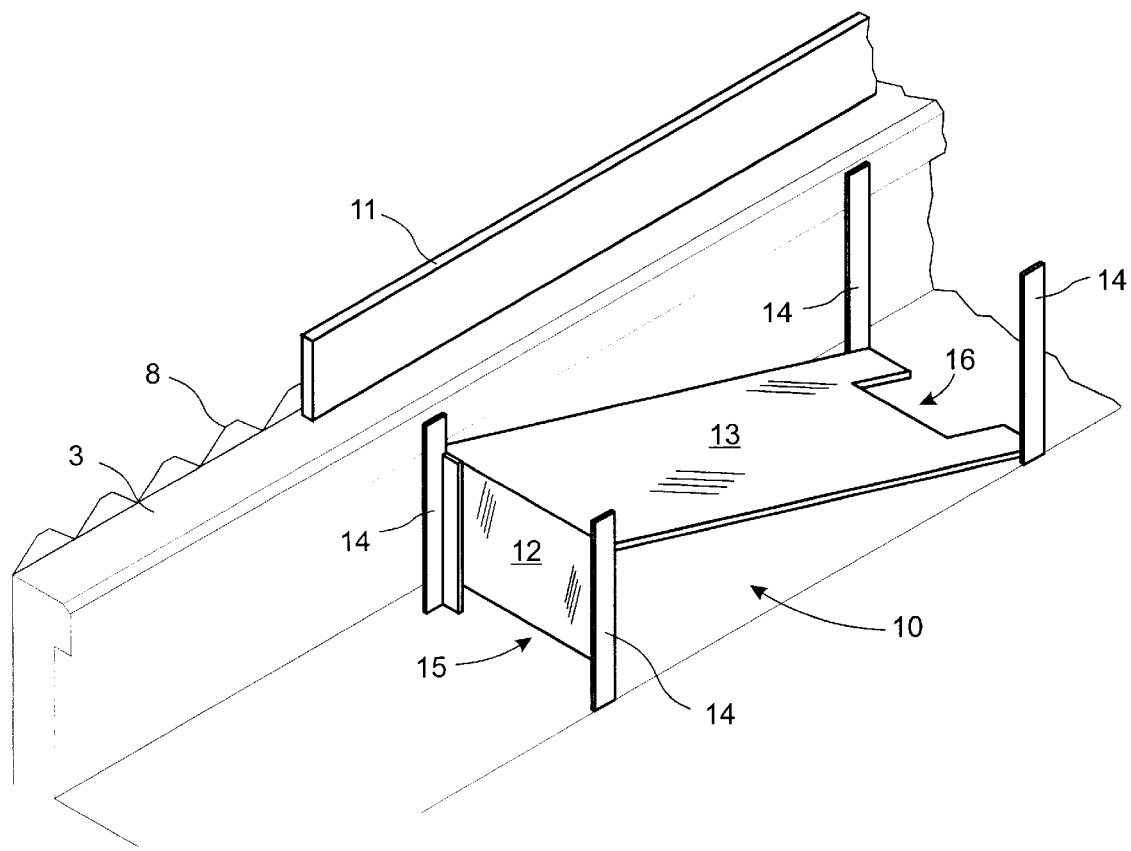
FIG. 5 is a perspective of a dam assembly in accordance with an embodiment of the present invention.

Referring now to FIG. 5 each dam assembly 10 generally comprises a dam wall 12 and a sluice ramp 13 secured in the effluent launder 5 by supporting members 14. The dam wall 12 includes a narrow opening 15 at its base, and the sluice ramp includes a complementary opening 16, so that some water in the flooded effluent launder 5 passes under the dam assembly 10, thereby preventing suspended solids from settling near the dam assembly 10. The majority of the waste-water stream flows over the top of the dam wall 12 and down the sluice ramp 13. The sluice ramp 13 is angled so that air entrainment and turbidity of the waste-water down-stream of the dam assembly 10 is minimized, thereby minimizing oxygen uptake by the waste-water. The control dam 11 prevents waste-water from passing over the V-notch weir 8 in the immediate vicinity (and downstream) of the dam assembly 10.

Figure 6:
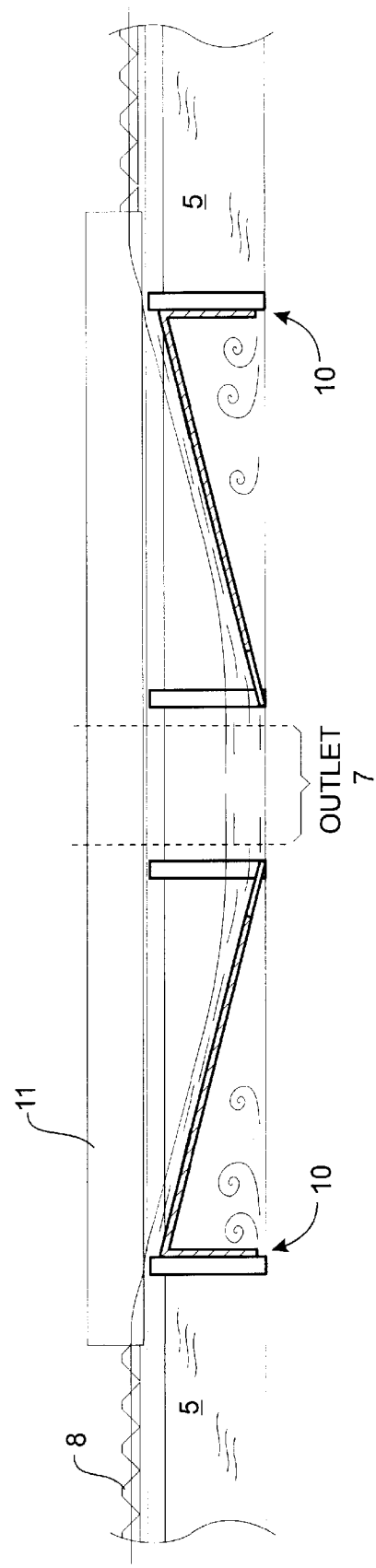
FIG. 6 is a partial elevation view showing a pair of dam assemblies in accordance with an embodiment of the present invention installed on either side of an outlet of an effluent launder.

In use, are a pair of dam assemblies 10, one on each side of the effluent launder outlet 7, as shown in FIG. 6. This ensures that most of the effluent launder 5 is flooded, and the required length of the control dam 11 is minimized.

The dam assemblies 10 can be constructed of any suitable material, such as steel, aluminum, or plastic material. If desired, the dam wall and sluice ramp can be contoured and curved to match the profile of the effluent launder, and so any gaps between the dam wall and sluice ramp and the walls of the effluent launder are minimized. Similarly, sealing members (not shown) can be employed to further reduce turbulent leakage of water between the dam wall and sluice ramp and the walls of the effluent launder. These improvements in the design of the dam assemblies can be expected to yield improved performance in terms of reduced O2 uptake and release of noxious gasses. However, in practice, satisfactory performance has been shown with simple rectangular dam assemblies in which fairly significant gaps existed between the sluice ramp and the walls of the effluent launder.

In the illustrated embodiment, the supporting members 14 comprise vertical members affixed to the front and rear ends of the dam assembly and which extend substantially the full height of the effluent launder. It will be seen, however, that the supporting members could readily be reduced to small lugs by which the dam wall and sluice ramp can be affixed directly to the walls of the effluent launder by means of bolts, screw or the like (not shown).

EXAMPLE INSTALLATION

By the end of December 1997, 14 primary clarifiers at the 500,000 m3/day Bonnybrook BPNR wastewater treatment plant in Calgary, Alberta had been modified in accordance with the present invention. Side-by-side testing and comparison between primary clarifier No. 13 which was modified in accordance with the present invention and primary clarifier No. 14 which was not modified, showed the following process and environmental benefits of the present invention:

Losses of VFAs from wastewater to the atmosphere is reduced by 83%;

Oxygen transfer to the waste water is reduced by 70%; and noise levels and intensity of malodors is dramatically reduced.

The present invention can also be employed in the effluent launders of secondary clarifiers of any WWTP to substantially reduce not only noises and malodors, but also the profuse growth of algae which typically occurs on concrete walls, surfaces, and peripheral weirs of the effluent launders. Algae creates unsightly conditions, is difficult and time consuming to remove, disrupts weir flow balance, decreases effluent quality in terms of CBOD5, TSS, TP, $NH_3$-N, etc., as well as reduces ultraviolet light disinfection efficiency, and increases annual operating and maintenance costs of electricity, lamp cleaning and lamp replacement. By creating submerged flow conditions in the effluent launder, the present invention reduces the penetration and availability of sunlight, thus substantially reducing surface areas on which algae growth takes place.

The skilled artisan will recognize that the invention can be modified without departing from the intended scope of the appended claims. Thus it will be understood that the above described embodiments are intended to be illustrative, rather than limitative of the present invention.

What is claimed is:

1. A waste water treatment clarifier comprising a settling tank defined by an inner perimeter wall, an inlet pipe disposed inside said inner perimeter wall of said settling tank to introduce raw sewage into said settling tank, an effluent launder defined by said inner perimeter wall and an outer perimeter wall surrounding said inner perimeter wall, said effluent launder having an outlet through which waste water flows for further processing, a V-notch weir affixed to an upper portion of said inner perimeter wall for allowing water in an upper level of said settling tank to flow over said inner perimeter wall into said effluent launder, wherein the improvement comprises:

a dam for damming and at least partially flooding said effluent launder; and a sluice attached to a downstream side of said dam, for minimizing air entrainment and turbidity of waste water flowing past said dam.

2. The waste water treatment clarifier according to claim 1, wherein the dam comprises a substantially vertical wall member extending across the effluent launder.

3. The waste water treatment clarifier according to claim 2, wherein an upper portion of the vertical wall member is disposed proximal an upper edge of the effluent launder.

4. The waste water treatment clarifier according to claim 3, wherein a lower edge of the vertical wall member is disposed at least partially separated from a floor of the effluent launder, whereby a portion of the waste water flows under the dam so as to prevent an accumulation of solids upstream of the dam.

5. The waste water treatment clarifier according to claim 1, wherein the sluice comprises a sloped ramp having a forward edge adjoining an upper edge of the dam, and extending downwardly and having a lower edge disposed toward said outlet proximal a floor of the effluent launder.

6. The waste water treatment clarifier according to claim 5, wherein a lower edge of said dam and said lower edge of said sluice includes a passage to allow a portion of the waste water to flow under the sluice so as to prevent an accumulation of solids between said dam and said sluice.

7. The waste water treatment clarifier according to claim 1, further comprising a control dam disposed proximal said V-notch weir for preventing flow of waste water past the V-notch weir in between the dam and the outlet of the effluent launder.

8. The waste water treatment clarifier according to claim 7, wherein there are two dams and associated sluices, each dam and sluice disposed within the effluent launder on respective opposite sides of said outlet, and wherein the control dam extends at least between the two dams, whereby most of the effluent launder is flooded.

9. The waste water treatment clarifier according to claim 7, wherein the control dam extends upstream of the dam, with respect to a direction of flow of waste water within the effluent launder, so as to provide a smooth flow of waste water toward the dam.

10. A waste water treatment clarifier comprising a settling tank and an effluent launder surrounding said settling tank, said effluent launder having an outlet for directing treated water away from said waste water treatment clarifier, wherein the improvement comprises:

a dam disposed in said effluent launder for partially flooding the effluent launder; and a sluice, attached to and disposed downstream from said dam for directing a flow of water past the dam toward said outlet with minimum air entrainment and turbidity.

11. The waste water treatment clarifier according to claim 10, wherein there are two dams and two associated sluices each disposed on opposite sides of said outlet of the effluent launder.

12. The waste water treatment clarifier according to claim 11, wherein said dams and said sluices have openings proximate a floor of the effluent launder to prevent accumulation of solids on said floor of said effluent launder.

13. The waste water treatment clarifier according to claim 12, further comprising a control dam disposed on an upper limit of a settling tank wall and spanning a distance between the two dams to prevent waste water from flowing over the settling tank wall at the outlet of the effluent launder.

* * * * *